United States Patent [19]

Pregnall

[11] 4,279,398
[45] Jul. 21, 1981

[54] VERSATILE HELMSMAN CHAIR FOR A YACHT

[76] Inventor: Lester W. Pregnall, 4026 Marine View Dr., Tacoma, Wash. 98442

[21] Appl. No.: 43,549

[22] Filed: May 29, 1979

[51] Int. Cl.³ ............................................. F16M 11/00
[52] U.S. Cl. .......................................... 248/405; 9/7
[58] Field of Search ......... 248/124, 125, 405; 108/147; 297/349; 114/188, 194; 9/7

[56] References Cited

U.S. PATENT DOCUMENTS

| | | | |
|---|---|---|---|
| 1,242,110 | 10/1917 | Koken | 248/405 |
| 2,893,470 | 7/1959 | Peller | 248/405 X |
| 3,428,976 | 2/1969 | Robinson | 9/7 |
| 3,642,320 | 2/1972 | Ward | 9/7 |
| 3,736,897 | 6/1973 | Krutz | 9/7 |
| 4,008,500 | 2/1977 | Hall | 297/349 X |
| 4,169,625 | 10/1979 | Petersen | 297/349 |

FOREIGN PATENT DOCUMENTS

| | | | |
|---|---|---|---|
| 534047 | 12/1956 | Canada | 248/405 |
| 671611 | 10/1963 | Canada | 248/405 |
| 1058716 | 1/1959 | Fed. Rep. of Germany | 248/405 |

Primary Examiner—J. Franklin Foss
Attorney, Agent, or Firm—Roy E. Mattern, Jr.

[57] ABSTRACT

A versatile helmsman chair is installed on a yacht in a cabin which serves both as a pilot house and a lounge. This helmsman chair is adjustably supported to be used at normal seating height above the lounge deck and to be rotated in any direction when a yacht is docked or anchored, and to be used at an elevated seating height above the lounge deck providing the helmsman with an excellent view, when the yacht is underway. This helmsman chair is distinguishable from others with respect to an electrically powered screw jacking gear assembly pivotally supporting the helmsman chair in the selective positions at and between the docked or anchored and underway positions.

4 Claims, 6 Drawing Figures

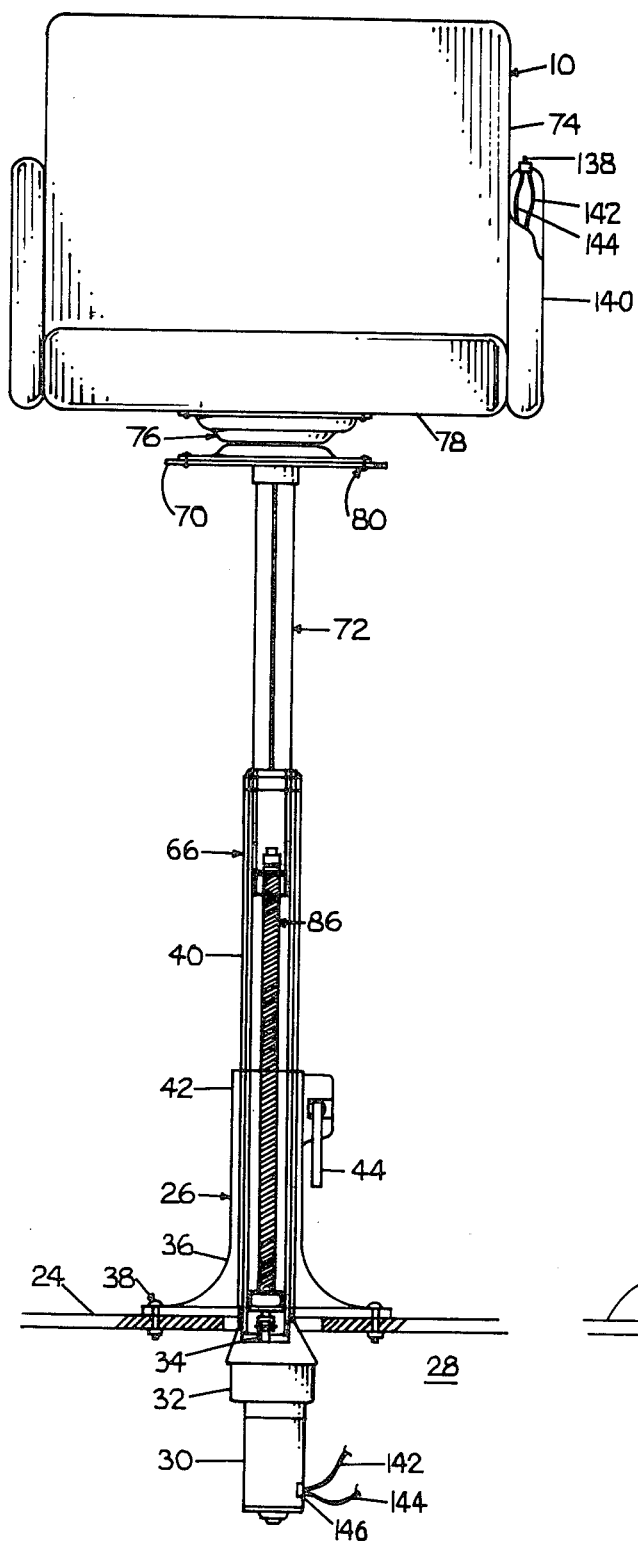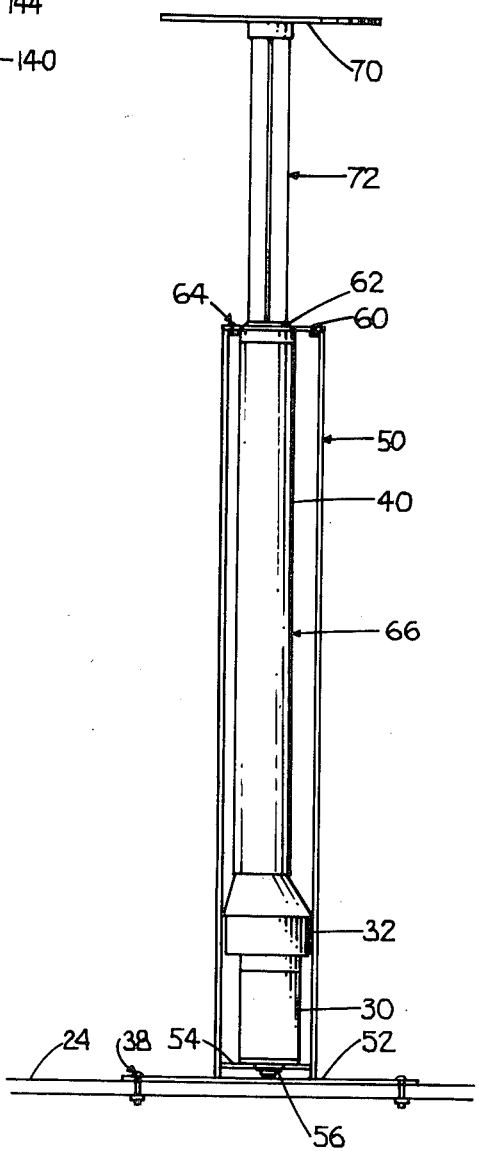
FIG. 4
FIG. 5

VERSATILE HELMSMAN CHAIR FOR A YACHT

BACKGROUND OF THE INVENTION

Aboard many yachts a steering station, i.e. the pilot house area, is provided in a cabin also utilized underway and when docked or anchored as a lounge. When underway, the helmsman, captain, or skipper, needs an unobstructed forward view, necessitating on many yachts the need for an elevated chair. Such an elevated chair on some yachts is permanently mounted at the raised elevation. On other yachts, generally with less cabin space, an empty helmsman chair is manually preset alternately at either the elevated underway position, or at the lower docked or anchored position, by the skipper before he sits down. Many types of these two position helmsman, captain, or skippers' chairs are available now and have been used in the past. However, no helmsman chairs are known by the applicant to be available, on which a helmsman, skipper, or captain, while remaining seated, may operate controls to move himself or herself from a lounge level directable position to and back down from one or more underway elevated positions.

In respect to shipboard and/or yacht mounting of equipment, such as tables, automatic leveling mechanisms have been provided as early as 1924, as set forth in U.S. Pat. No. 1,490,904, wherein Clark Anders disclosed how to keep such equipment level, notwithstanding the tilting or pitching of the ship. However, apparently no person was concerned with the changing of elevation of a helmsman chair by a skipper, who could operate nearby controls, while remaining seated in the chair, and also controlling his or her directional position.

For other purposes, not aboard a boat, yacht or ship, others have provided seating which could be located at respective elevations. Frank W. Adsit, used screw jack mechanisms to raise and lower an opera chair as set forth in his U.S. Pat. No. 1,282,164, issued in 1918. To meet the respective sizes of persons, Fred Gorden in 1952 provided his chair as shown in U.S. Pat. No. 2,608,239 using a powered screw jack mechanism. For barber and beauty shops Howard F. Newman in 1961, in his U.S. Pat. No. 2,989,280, disclosed an adjustable height chair also using a power screw jack mechanism to raise and lower the person having his or her hair groomed by a barber and/or hair dresser. A hydraulically adjustable height seat for vehicles is disclosed in Edward M. Greer's U.S. Pat. No. 3,436,048 issued in 1969. A hydraulic lift device with a seat attachment is set forth in John E. Nolan's U.S. Pat. No. 3,256,036 of 1966. Also many other adjustable seating assemblies are indicated by Dean H. Hale's utility stool illustrated in his U.S. Pat. No. 3,147,946, issued in 1964.

Although many earlier inventors were concerned with adjustable seating and elevation changing mechanisms and marine leveling mechanisms, there remained a need for a more versatile helmsman chair for a yacht. Especially, for such a chair which could be positioned for both underway and docked or anchored use by a helmsman, captain, or skipper, who while so seated, could raise and lower the helmsman chair, using convenient controls, and also change the direction of his or her facing while so seated.

SUMMARY OF THE INVENTION

For many yachts, a helmsman chair is positioned for a skipper, pilot, captain, or helmsman, to be seated at a lower convenient height in a lounge or salon cabin, facing the interior in selected directions during dockside or anchor times, and to be seated at an elevated, higher, convenient, height, as a portion of the lounge or salon cabin becomes the pilot house, when the yacht is underway and forward clear vision is required, as the wheel is held and/or turned to keep or to redirect the yacht on a selected course. For such positioning of the helmsman chair, a powered screw jack supporting mechanism, is operated as the skipper, pilot, captain, or helmsman, remains seated and operates conveniently located controls, and a swivel directional supporting mechanism, included therein, responds to his or her hand and/or arm torque creating forces.

DESCRIPTION OF THE DRAWINGS

Preferred embodiments of a versatile helmsman chair for a yacht are illustrated in the drawings, wherein:

FIG. 4 is a front elevational view, with portions removed, illustrating how the first embodiment of the versatile helmsman chair is supported and operated;

FIG. 5 is a partial front elevational view, with portions removed, illustrating a second embodiment, wherein all of the mechanisms are arranged above the deck.

DESCRIPTION OF THE INVENTION

Figure 1:
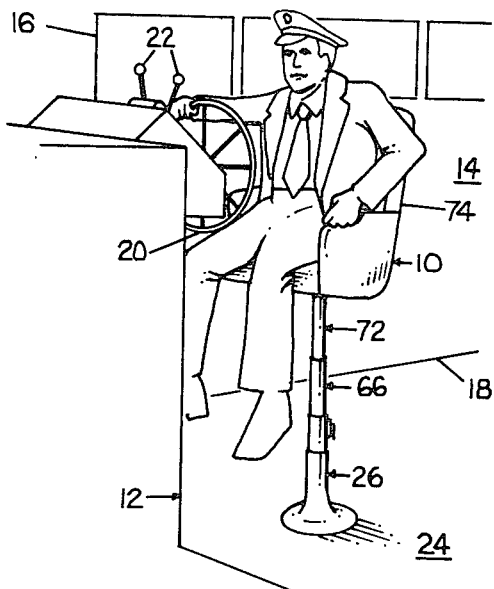
FIG. 1 is a partial perspective interior view of a lounge or salon cabin on one forward side used as a wheelhouse, illustrating the versatile helmsman chair at an elevated bow facing position, while supporting a seated skipper, pilot, captain, or helmsman, who is controlling the wheel to keep the yacht on a selected course.
Figure 2:
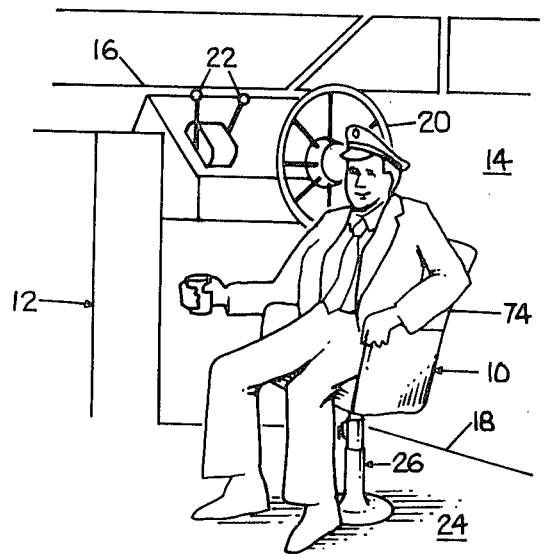
FIG. 2 is a partial perspective interior view similar to FIG. 1, but viewed from a different direction, illustrating the versatile helmsman chair at a lower position, while supporting a seated skipper, pilot, captain, or helmsman, who is pivoted clear of the wheel to join others in the lounge or salon cabin during dockside or anchor activities.

A versatile helmsman chair 10, as illustrated in use in FIGS. 1 and 2, is installed on a yacht 12 often in a cabin 14, or a designated area, which serves both as a pilot house 16 and a lounge 18 or salon. In FIG. 1 the helmsman, captain, or skipper, has raised himself or herself to an elevated position, adjacent to the wheel 20, and other throttle controls 22 for his or her unobstructed forward view, while the yacht 12 is underway. Yet when the yacht 12 is at dockside or at anchor, the helmsman, captain, or skipper, lowers himself or herself to a position of normal seating height above the lounge deck 24, and rotates this versatile helmsman chair 10 to join into activities with other crew members, guests, and/or passengers, as illustrated in FIG. 2.

Figure 3:
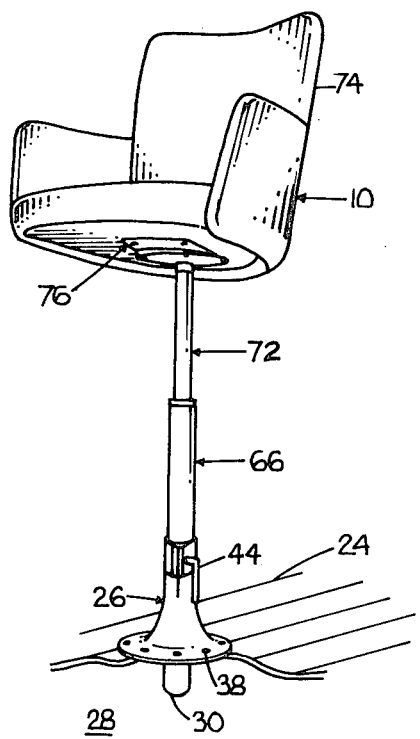
FIG. 3 is a perspective view of a first embodiment of the versatile helmsman chair, illustrating how it is mounted on the lounge or salon cabin deck with some of the mechanism arranged below the deck.

An embodiment of this helmsman chair 10, is shown in FIG. 3 in a raised underway position, indicating a deck mounting assembly 26 secured to the lounge deck 24. This same embodiment is also illustrated in FIG. 4 in a raised underway position, indicating many of the interrelated structural, mechanical and electrical components. When there is adequate space 28 below the lounge deck 24, an electrical motor 30, with its gear box 32 and drive shaft 34, are positioned in this space 28. The overall positioning of the entire helmsman chair 10 is undertaken by using a flanged mounting base 36, secured with fastener assemblies 38 to the lounge deck 24, which clamps in a selected place the outer sleeve 40 of the helmsman chair 10. The upper split clamping end 42 of the base 36 is tightened upon rotation of the threaded clamping arm 44 to securely grip the outer sleeve 40.

Another embodiment of this helmsman chair 10 is shown in part, in FIG. 5, in a raised underway position, indicating an all above deck mounting assembly 50 secured to a lounge deck 24. The assembly 50 includes an outside base 52 secured by fastener assemblies 38 to the lounge deck 24; an integral inside base 54, with a central recess 56; an upright column 58 secured to the base 52; and a top cover 60 with a central recess 62 secured by fastener assemblies 64. The non extendable portions 66 of the helmsman chair 10 are non rotatably supported within this above deck mounting assembly 50.

Both embodiments of the helmsman chair 10 include a seat swivel assembly mounting plate 70 secured to the top of their extendable portions 72, as shown in FIGS. 3A and 5. A seat 74, having a swivel assembly 76 secured to seat bottom 78, is mounted on the extendable portions 72 of the helmsman chair 10, as the swivel assembly 76 is attached to the mounting plate 70, using fastener assemblies 80. Such swivel mounting of the seat 74 is utilized by a helmsman, captain, or skipper to conveniently change his facing direction from forward, while underway, to other facings when the yacht 12 is at dockside or at anchor, and the helmsman chair 10 is lowered to normal chair height above the lounge deck 24.

Figure 6:
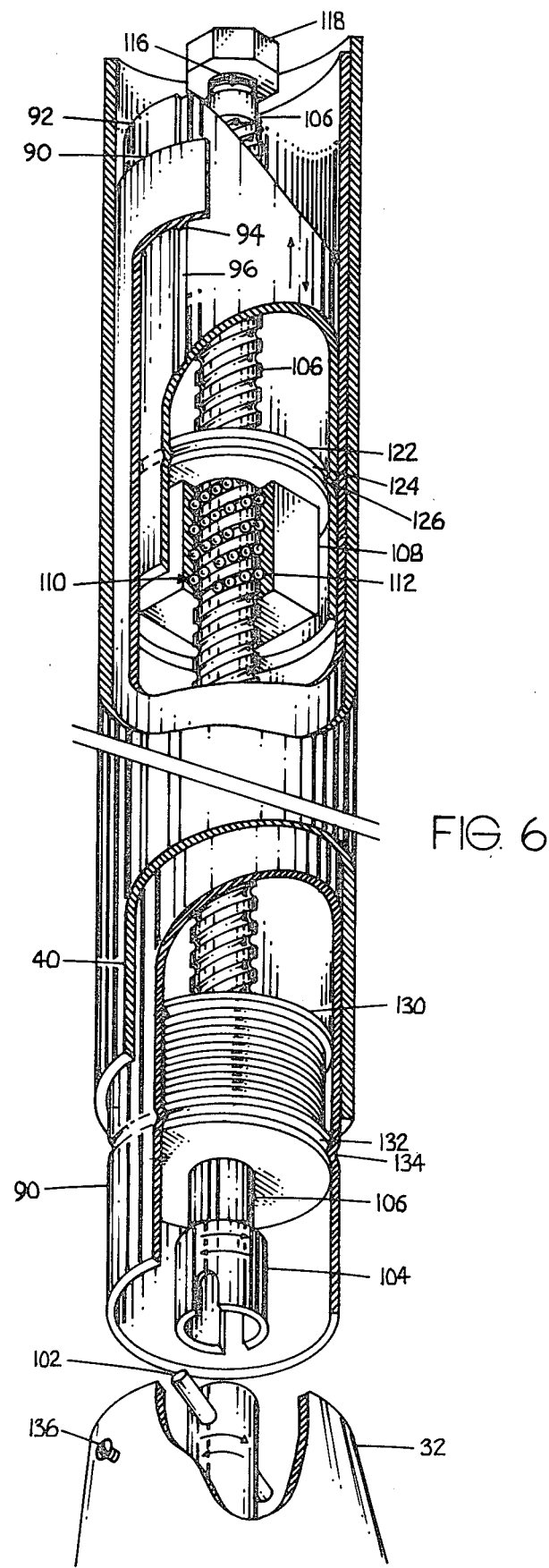
FIG. 6 is an enlarged partial view, with portions removed, illustrating the powered screw jack support mechanism of all embodiments.

Both embodiments of the helmsman chair 10, include the interrelated non extendable portions 66, and the extendable portions 72, of an overall screw jack assembly 86, as illustrated in FIGS. 4 and 6. This assembly 86, with little or no modification in respect to the installations shown in the two embodiments of FIGS. 4 and 5, is the LECTRA JACK, number 41606, manufactured by Reese Products of Elkhart, Indiana, mounted end for end, from the original designed use of jacking the tongues of trailers.

An outer sleeve 40 is added and non rotatably mounted to the combined gear box 32 and electric motor 30 as especially shown in FIGS. 4 and 6 to strengthen and protect the outer stationary tube or cylinder 90, which is also mounted to the combined gear box 32 and electric motor 30. This outer sleeve 40 could possibly not be used in the embodiment illustrated in FIG. 5, because the above deck mounting assembly 50 serves both protective and strengthening functions. An inner movable tube or piston 92 slides down into the outer stationary tube or cylinder 90, as the helmsman chair 10 is lowered to chair height in the lounge 18, and slides upwardly partially out of the outer stationary tube or cylinder 90, as the helmsman chair 10 is raised to the elevated position, when the yacht 12 is underway. Relative rotation of these tubes 90, 92 is prevented, as the interior projection rib 94 on the outer stationary tube or cylinder 90 is axially guided in the exterior groove or guide 96 on the inner movable tube or piston 92.

The relative axial translation of the inner movable tube 92 into and out of the outer stationary tube 90, is caused as the rotative power of an electric motor 30, via a gear box 32, drive shaft 34, and coupling components 100, i.e. transverse load pin 102, and transverse slotted receiver 104, is applied to the axial rotatable jacking screw 106. As this jacking screw 106 rotates, a nut 108, via a ball bearing screw assembly 110, translates upwardly or downwardly along the jacking screw 106, carrying the inner movable tube 92, to which the nut 108 is non rotatably secured. The seat 74 of the helmsman chair 10 is therefore also translated upwardly or downwardly as the jacking screw 106 is rotated, via the swivel mounting of the seat as illustrated in FIG. 4. The inner movable tube 92 is the essential component of the extendable portions 72, and the outer tube 90 is an essential component of the non extendable portions 66 of the helmsman chair 10.

The ball bearings 112 used in the ball bearing screw assembly 110 very effectively reduce the frictional load as the captain, skipper, or helmsman, remains seated during the up and down operations of the helmsman chair 10. The end threads 116 on the jacking screw 106, receive a stop nut 118, which prevents the nut 108 from leaving the jacking screw 106.

The nut 108 is interfitted with the inner movable tube or piston 92 by securing to the nut 108 a cylindrical adapter 122, having a circumferential groove 124, which receives an inwardly projecting circular rib 126 formed on the inner movable tube or piston 92, as illustrated in FIG. 6. Another cylindrical adapter 130 is secured to the outer stationary tube 90, having a circumferential groove 132, which receives an inwardly projecting circular rib 134 formed on the outer stationary tube or cylinder 90. The adapter 130 is understood to serve holding, bearing, alignment, and/or shock absorbing functions. Set screws 136 are used to axially position components such as the gear box 32 to the inner stationary tube 90 and/or outer sleeve 40.

The electric motor 30 is controlled by operating a switching assembly 138 located in an armrest 140, of the seat 74, which through the electrical wires 142, 144, operates a switching assembly 146 at the electric motor 30. The electrical wires 142, 144, well insulated and secured, extend internally of the helmsman chair between the respective switches 138 and 146.

I claim:

1. A versatile helmschair for a yacht, powered upwardly from a rearwardly facing lounge seating height in a lounge of a yacht to an elevated forward viewing height in a pilot house portion of this lounge, and the helmsman, captain, or skipper remains seated in this helmschair and operates his controls of this helmschair, which are located in the arm of this helmschair to raise and to lower this helmschair, while he remains seated, and at any time he may change his facing direction upon swiveling, at any elevation, in either direction of rotation, from the lounge and stern facing direction to the bow facing direction, comprising:

(a) a comfortable upholstered lounge chair serving also as a helmschair;

(b) a swivelable chair attachment assembly secured to the bottom of the lounge chair;

(c) a lounge chair raising and lowering assembly secured to the swivelable chair attachment assembly, comprising in turn:
  (1) an extendable hollow cylindrical portion secured to the swivelable seat attachment assembly and having an axial guide means permitting up and down motion, but no rotational motion;
  (2) a stationary hollow cylindrical portion slidably fitted to the exterior of the extendable hollow cylindrical portion and having an axial guide means permitting up and down motion, but no rotary motion;
  (3) a screw jack mechanism secured between and within the extendable portion and stationary portion to move them relative to one another, and thereby to raise and to lower the upholstered lounge chair serving also as a helmschair; and
  (4) an electric motor to power the screw jack mechanism, using the yacht electrical power source and operated as the helmsman, captain, or skipper, while seated, utilizes the controls located in the arm of the lounge chair serving also as a helmschair; and
(d) a deck mounting assembly secured to the lounge chair raising and lowering assembly, and adapted for securement to the deck of a yacht.

2. A versatile helmschair for a yacht, as claimed in claim 1, wherein the screw jack mechanism has a screw jack rotatably mounted to the stationary hollow cylindrical portion of the lounge chair raising and lowering assembly, and the screw jack mechanism has a nut non rotatably mounted to the extendable hollow cylindrical portion of the lounge chair raising and lowering assembly.

3. A versatile helmschair for a yacht, as claimed in claim 2, wherein the deck mounting assembly is arranged for partial below deck installation of the screw jack mechanism and the complete below deck installation of the electric motor of the lounge chair raising and lowering assembly.

4. A versatile helmschair for a yacht, as claimed in claim 2, wherein the deck mounting assembly is arranged for the entire above deck installation of the lounge chair raising and lowering assembly.

* * * * *